(12) United States Patent
Patron et al.

(10) Patent No.: US 9,708,554 B2
(45) Date of Patent: Jul. 18, 2017

(54) SYSTEM AND PROCESS FOR THE HYDROCONVERSION OF HEAVY OILS

(71) Applicant: ENI S.P.A., Rome (IT)

(72) Inventors: Luigi Patron, Milan (IT); Giuseppe Bellussi, Piacenza (IT); Lorenzo Tagliabue, Piacenza (IT); Vincenzo Piccolo, Zelo Buon Persico (IT)

(73) Assignee: ENI S.p.A., Rome (IT)

( * ) Notice: Subject to any disclaimer, the term of this patent is extended or adjusted under 35 U.S.C. 154(b) by 0 days.

(21) Appl. No.: 14/584,539

(22) Filed: Dec. 29, 2014

(65) Prior Publication Data

US 2015/0210940 A1    Jul. 30, 2015

Related U.S. Application Data

(63) Continuation of application No. 12/601,363, filed as application No. PCT/EP2008/004118 on May 19, 2008, now abandoned.

(30) Foreign Application Priority Data

May 23, 2007    (IT) .............. MI2007A1044

(51) Int. Cl.
 *C10G 67/02*    (2006.01)
 *B01J 8/22*    (2006.01)
 *C10G 49/00*    (2006.01)
 *B01J 8/10*    (2006.01)

(52) U.S. Cl.
 CPC ............ *C10G 67/02* (2013.01); *B01J 8/10* (2013.01); *B01J 8/22* (2013.01); *C10G 49/00* (2013.01); *B01J 2208/00823* (2013.01); *B01J 2208/00893* (2013.01); *C10G 2300/107* (2013.01)

(58) Field of Classification Search
 CPC ... B01J 8/226; B01J 8/224; B01J 8/22; C10G 49/18; C10G 49/12; C10G 49/00; C10G 47/26
 See application file for complete search history.

(56) References Cited

U.S. PATENT DOCUMENTS

| | | | |
|---|---|---|---|
| 2,497,309 A | 2/1950 | Larson et al. | |
| 3,248,319 A * | 4/1966 | Bowles | B01J 8/386 208/110 |
| 3,297,563 A | 1/1967 | Doumani | |
| 3,488,280 A * | 1/1970 | Schulman | C10G 1/083 208/419 |
| 3,725,247 A | 4/1973 | Johnson et al. | |
| 4,521,295 A | 6/1985 | Chervenak et al. | |
| 6,436,279 B1 | 8/2002 | Colyar | |
| 6,841,064 B1 * | 1/2005 | Weiss | C10B 49/20 208/361 |
| 2006/0054533 A1 | 3/2006 | Chen et al. | |
| 2011/0005976 A1 | 1/2011 | Rispoli et al. | |

* cited by examiner

*Primary Examiner* — Lessanework Seifu
(74) *Attorney, Agent, or Firm* — Oblon, McClelland, Maier & Neustadt, L.L.P.

(57) ABSTRACT

Provided is a system for the hydroconversion of heavy oils essentially consisting of a solid accumulation reactor and a stripping section of the products of hydroconversion outside or inside the reactor itself.

15 Claims, 5 Drawing Sheets

SYSTEM AND PROCESS FOR THE HYDROCONVERSION OF HEAVY OILS

CONTINUATION DATA

This application is a Continuation of application Ser. No. 12/601,363, filed on Apr. 20, 2010, which is a National Stage application of PCT/EP08/004118, filed on May 19, 2008, both of which are incorporated herein by reference The present invention relates to a system and relative process used for the complete and high-productivity conversion of crude oils, heavy crude oils, bitumens from tar sands, distillation residues, heavy distillation cuts, deasphalted distillation residues, synthetic oils from Fischer-Tropsch processes, vegetable oils, oils deriving from coke and oil shales, oils obtained from the thermodecomposition of waste products, polymers, biomasses, to distilled products with the use of hydrogenation catalysts or catalytic compositions, preferably in slurry phase and more preferably based on molybdenum.

The system proposed consists of a solid accumulation hydroconversion reactor in which the solids deriving from and generated by the feedstock treated (metals in the form of sulphides and coke) are accumulated, up to very high levels, and a hot gas stripping section of the reaction liquid, designed in relation to the type of reactor adopted, for the direct and continuous removal of the conversion products, including high-boiling products.

This reactor allows the solids deriving from and generated by the feedstock treated to be removed by applying limited flushings which imply low reintegrations of catalyst, without the necessity of separating the catalyst from the reaction medium to remove the solids. This stripping section allows the direct extraction of the conversion products from the reaction liquid, including the high-boiling products. The outflow of all the conversion products takes place in vapour phase directly in the reaction section, without resorting to further separation phases by distillation or by extraction with a solvent.

In the processes used in the hydroconversion of heavy hydrocarbon residues, the feedstock to be treated is put in contact with hydrogen in the presence of a hydrogenation catalyst under suitable temperature and pressure conditions. The feedstock to be converted is continuously fed to the reactor. The conversion degree per single passage is never total, on the contrary it is far from being so, to the extent that in industrial practice at least two reactors must be put in series to obtain a conversion degree which reaches at least 70%. The fraction of non-converted feedstock is destined for fuel oil or other equivalent uses, which gives low economic remuneration and at times is environmentally problematical.

In order to obtain the total zeroing of the fuel oil, i.e. the total conversion of the heavy oil to products, the method has been adopted of recycling the non-converted asphaltene residue to the reaction, i.e. that remaining of the liquid stream of the reactor, normally removed at the outlet by a high-pressure liquid/vapour phase separator, after recovering the conversion products obtained by distillation (U.S. Pat. No. 4,066,530), or by distillation and subsequent extraction with a solvent (U.S. Pat. No. 5,932,090).

The recovery of the conversion products contained in the liquid phase at the outlet of the reactor is extremely important for minimizing the recycling to the reactor and increasing the productivity. For this purpose, a whole plant section is necessary for the recovery of the products and separation of the catalyst and non-converted residue to remove the metals deriving from the feedstock and coke generated in the reaction.

The sequence of operations required, however, is not easy to effect due to the formation of coke when the liquid effluent is thermally treated in the absence of hydrogen, as for example in vacuum distillation for the extraction of high-boiling products. The formation of coke also produces negative effects on the activity of the catalyst. As a result of this, it has been proposed (U.S. Pat. No. 5,298,152) to constantly maintain the liquid phase of the recycling in a hydrogen atmosphere, at a minimum pressure, introducing however precise limits for the recovery of the high-boiling conversion products contained therein.

The recycling of the catalyst can also be critical as a result of agglomeration phenomena of the asphaltenes and settling of the catalyst itself (U.S. Pat. Appl. 2006/00545333A1) which can be remedied by adding further operations and equipment in the recycling section. Only partial solutions are therefore proposed, in some cases not without counterindications.

From what is known so far, the process phases which have not yet found fully satisfactory solutions relate to:
- the separation and consequently recycling of the catalyst for the removal of the solids deriving from and generated by the feedstock treated.
- the recovery of the conversion products, comprising the high-boiling products, contained in the liquid phase of the reaction medium.

A system and the relative process have now been found which solve the problems so far encountered in hydrocracking processes for the total conversion to distillates of heavy residues.

The system for the hydroconversion of heavy oils, first object of the present invention, essentially consists in a solid accumulation reactor and a stripping section of the conversion products outside or inside the same reactor.

The process uses a hydroconversion reactor with the accumulation of solids which operates under high severity conditions with respect to catalytic concentration and temperature, combined with a specific hot gas stripping section.

This process allows the direct removal of the solids deriving from and generated by the feedstock treated and also to obtain the conversion products, including the high-boiling products contained in the liquid phase of the reaction medium proposed, directly in the outflow of the vapour phase.

This process can also be optionally applied by removing a quota of outflow of the reactor in liquid phase. In the preferred configuration, with the outflow exclusively in vapour phase, the catalyst and non-converted residue remain constantly inside the reaction system.

This prerogative of the process according to the invention allows the hydrocracking to be carried out under high severity reaction conditions with respect to both the concentration of the catalyst and temperature by running the reaction under solid accumulation conditions. By operating according to the process proposed, the problems and plant complexity which would be encountered by proceeding contrary to the present case, with the separation of the asphaltene residue and recycling of the catalyst in specific and dedicated sections of the plant, are overcome. In the present case, the reaction liquid (and with this the catalyst), from which: i) the solids deriving from and generated by the feedstock, left to accumulate in high concentrations, are directly removed by means of flushing, ii) the conversion products, also high-boiling, are continuously removed by stripping, is not removed from the reaction system. The possibility of maintaining the catalyst and non-converted residue constantly in the reaction medium prevents the deactivation of the catalyst itself, and also the thermal dehydrogenation and consequently coking of the asphaltenes, a frequent cause of the formation of carbonaceous deposits when, alternatively to stripping, the high-boiling products are recovered by vacuum distillation. These factors are known to lower the hydroconversion rate and negatively influence the operating continuity of the plant.

The use of the hydroconversion system and relative process proposed also considerably simplifies the process by eliminating, in the present case, the whole section of the plant necessary for:
a) the treatment of the liquid effluent of the reactor by extraction of the distillates, medium distillates and high-boiling products; b) the separation and recycling of the catalyst and asphaltenes.

Describing the invention proposed hereunder in greater detail, the system for the hydroconversion of heavy oils, first object of the present invention, essentially consists of a solid accumulation reactor and a stripping section of the conversion products outside or inside the same reactor.

The reactor is homogeneously stirred, operates under stationary conditions and is preferably selected from stirred tank reactors or bubble towers. It is also necessary for there to be no elements inside the reactor which can prevent a uniform stirring of the reaction mass, such as for example fixed or mobile catalytic beds, as this is designed to operate under conditions implying a strong accumulation of solids.

The stripping section can be inside the reactor and positioned so as to preferably effect the stripping in the upper part of the reactor itself: in this case the reactor is partially filled.

In the system claimed there can also be a liquid-vapour separator downstream of the reactor, possibly comprising a cyclone, and in this case the stripping section can be:
either inside the reactor and positioned so as to effect the stripping preferably in the upper part of the same reactor, said reactor being totally filled;
or outside the reactor and positioned between the reactor and the liquid-vapour separator, in the liquid-vapour separator or downstream thereof, for example in a specific vessel possibly operating at reduced pressure, so as to effect the stripping outside the reactor and preferably recirculating the stripped liquid to the same reactor by means of a pump.

Again in the presence of a liquid-vapour separator, the system can also contemplate a combination of a stripping both inside and outside the reactor as described above.

In the system claimed, the reactor can be equipped with means for the external circulation of the reaction mass, comprising pump and recirculation ducts, from a lower side point to a side point in the upper part of the reactor, wherein the stripping section is positioned so as to effect the stripping by the entry of hot gas into the recirculation ducts delivered by the pump itself.

In the system claimed, the inside of the reactor can be equipped with means, comprising pump and duct, for the internal recirculation of the reaction mass from a lower point to a point at the top of the reactor, wherein the stripping section is positioned so as to effect the stripping by the entry of hot gas into the same recirculation duct, delivered by the pump itself.

In the latter two cases, the system can also have a liquid-vapour separator and optionally also a further stripping section, outside the reactor and positioned in the liquid-vapour separator or downstream thereof, for example in a specific vessel possibly operating at reduced pressure, so as to effect the stripping outside the reactor and ensuring the recirculation of the stripped liquid to the same reactor by means of a pump.

A further object of the present invention relates to the use of a solid accumulation reactor selected from stirred tank reactors or bubble towers for the hydroconversion of heavy oils.

Another object of the present invention relates to the process for the hydroconversion of heavy products.

The process for the conversion of heavy oils, selected from crude oils, heavy crude oils, bitumens from tar sands, distillation residues, heavy distillation cuts, deasphalted distillation residues, synthetic oils from Fischer-Tropsch processes, vegetable oils, oils deriving from coke and oil shales, oils obtained from the thermodecomposition of waste products, polymers, biomasses, comprises sending the heavy oil to a hydrotreatment step effected in a suitable solid accumulation reactor with an appropriate hydrogenation catalyst in slurry phase, into which hydrogen or a mixture of hydrogen and $H_2S$ are fed, characterized in that it comprises one or more stripping phases with a suitable hot stripping gas in order to obtain conversion products exclusively in vapour phase.

The reaction system proposed, for the complete and high-productivity conversion of heavy oils to distillates, is based on a particular combination of functionalities obtained as illustrated in FIGS. 1 to 5 and described hereunder.

In order to obtain the advantages of productivity and inexpensiveness, complete convertibility of heavy oils to distillates, plant simplification, continuous operability of the plants, it is important to define the specific conditions for:
running the solid accumulation reactor under high severity conditions limiting the catalyst consumption within economically acceptable limits and effecting the removal of the solids generated by the feedstock directly from the reaction section;
recovering the high-boiling products directly from the reaction section making said conditions compatible with a high liquid filling degree, i.e. exploitation, of the reactor.

It is known that increasing the hydrocracking temperature to increase the productivity causes, in particular above certain limits, a marked formation of coke and also insoluble asphaltene resins which can greatly limit the possibilities of use of high catalytic concentrations. The use of a suitably managed solid accumulation reactor is the solution proposed herein.

The catalyst, or hydrogenation catalytic composition, preferably finely dispersed, is a decomposable precursor or a preformed compound based on one or more transition metals, preferably molybdenum.

This catalyst is initially charged, "una tantum" in proportion to the reaction volume to be continuously kept in the reaction medium. In this way, the catalyst almost indefinitively maintains its activity without any necessity of intervention, thus completely eliminating the deactivation problems widely described in scientific and patent literature. An integration of catalyst is required, in any case without ever separating the catalyst itself from the reaction medium, when a flushing of the liquid phase is effected to remove any possible accumulations of solids deriving from or generated by the feedstock treated. This is the case of the treatment of vacuum residues of crude oils with a high content of heavy metals. In addition to supplying heavy metals, the heavy feedstock also generates, in particular when operating under high severity hydrocracking conditions and depending on the content of carbonaceous residue which characterizes it, varying quantities of coke which can no longer be converted to distillates by the reaction system. When the hydrocracking is carried out under high severity conditions, the production of coke can widely exceed the quantity of metallic sulphides generated by the feedstock.

By using the process according to the invention, it is possible to allow the solids generated by the feedstock (metal sulphides and coke) to accumulate inside the reaction mass at very high concentrations, for example up to 200 kg per $m^3$ and over, without creating adverse effects on the catalyst and the functionality of the overall reaction system. Once the pre-established accumulation level has been reached, the metal sulphides and coke generated by the feedstock being processed are directly and continuously removed from the reaction medium by flushing. The quantity of catalyst removed with the flushing is integrated to the same amount in continuous or batchwise but at regular time intervals. If the feedstock to be treated has a low metal content and a limited carbonaceous residue, the accumulation rate of the solids in the reaction medium is minimum and consequently the flushing necessary for removing the solids generated is negligible and the reintegration of the catalyst is also minimum.

With reference to the formation of coke, on the basis of experimentations carried out by the proponent, it has also proved useful to describe in primis the behaviour of the feedstock through measuring the quantity of insoluble residue which is produced in the reaction according to an analytical method specifically developed for the characterization of asphaltene residues with a high solid content. Once the reaction mass has been diluted with tetrahydrofuran, the insoluble products which are recovered by filtration consist of the metal sulphides initially present in the feedstock and the coke formed during the reaction. Insoluble asphaltene resins, precursors of coke can also be present.

The catalyst is also present in proportion to the quantities used. The quantity measured of products insoluble in tetrahydrofuran ($THF_1$) supplies, less the quantity of insoluble resins present, the quantity of coke and metal sulphides which are produced in the reaction, to be removed by flushing. It has been experimentally found that this value increases significantly when the hydrocracking conditions become more severe, rapidly exceeding 3 kg per ton of feedstock processed. Starting from this level of $THF_1$, in order to be able to operate in the presence of a high concentration of catalyst based on molybdenum, not lower than 5 kg per $m^3$ referring to the reaction medium and preferably not lower than 8 kg per $m^3$, an accumulation level of solids in the reaction medium not lower than 50 kg per $m^3$ and preferably not lower than 100 kg per $m^3$, is selected, in particular when the characteristics of the feedstock and severity conditions of the reaction are such as to generate a formation of residues insoluble in tetrahydrofuran at levels of 3 kg per ton fed, or over. Once the pre-established accumulation level has been reached, after the start-up of the reactor, the metal sulphides and coke generated by the feedstock being processed are directly and continuously removed from the reaction medium, by flushing, in proportion to the quantity generated. The entity of the flushing required depends on the rate at which the coke and metal sulphides are generated and on the concentration of solids in the reaction medium under stationary conditions. By operating according to the process described, the flushing can be easily maintained at a level lower than 2% with respect to the feedstock fed.

The solid accumulation reactor is preferably run under hydrogen pressure or a mixture of hydrogen and hydrogen sulphide, ranging from 100 to 200 atmospheres, within a temperature range of 380 to 480° C. As a result of the prerogatives of the high solid accumulation reactor, the high temperatures necessary for operating at high severity-high productivity can be used, also with a generation of products insoluble in tetrahydrofuran which reaches or exceeds 10 kg per ton of feedstock processed.

The recovery of the conversion products from the liquid reaction phase, comprising the high-boiling products, is obtained by means of the hot gas stripping section designed in relation to the reactor with which it is combined. The preferred stripping gas is hydrogen and mixtures thereof, possibly taken from recycling gases. The gas sent to the stripping section, when this is positioned inside the reactor, must not penetrate the reaction mass to avoid causing an undesired increase in hold-up gas, i.e. jeopardizing the liquid filling degree of the reactor itself and with this the productivity of the system. Unlike the stripping gas, the flow-rate of the reaction hydrogen, fed to the base of the reactor through a suitable apparatus to obtain the best distribution, is defined on the basis of the passage section through the reactor, an upper limit also being defined, regardless of its height and consequently of the flow-rate of the feedstock fed.

The reaction system operating under the conditions described above, allows the stripping of the high-boiling products, in particular the fractions with a boiling point higher than the temperature of the reactor, at the same time maintaining the high liquid filling degree of the reactor in turn as a result of the low hold-up gas index ensured by the limits imposed on the flow-rate of the gas introduced into the lower part of the reactor. When using the hydroconversion system as described above, the outflow of the reactor operates exclusively in vapour phase obtaining the total conversion to distillates of the feedstock fed.

The flow-rate of the feedstock being fed, due to the specific functioning conditions of the reaction section, with a constant liquid volume and without a liquid outflow, cannot be established a priori but necessarily and exclusively derives from the conversion capacity of the reaction system. In practice, the flow-rate in the feeding is regulated by the level indicator, situated at the Liquid/Vapour (L/V) interface which can be inside or outside the reactor. The flow-rate of the feedstock thus regulated can vary from 50 to 300 kg/h per $m^3$ of reaction volume depending on the severity degree of the reaction conditions established.

In order to obtain an effective extraction of the high-boiling conversion products from the liquid reaction phase, a stripping is effected with hydrogen heated to a temperature close to the reaction temperature and preferably heated to a temperature higher than the reaction temperature. It is also preferable for the reaction liquid, in the stripping phase, to also be at a temperature close to or higher than that of the reactor to favour the removal of the converted products.

The flow-rate of the hydrogen used for the stripping is in relation to the quantity of feedstock treated. Quantities of hydrogen of at least 0.1 kg per kg of fresh feedstock treated are used, with the flow preferably in countercurrent.

When the stripping hydrogen is put in contact with a limited volume of reaction liquid, as in the cases represented in FIG. 3, FIG. 4, FIG. 5, the liquid, after stripping, is recirculated by means of the pump P at a flow-rate at least equal to 20% of the flow-rate of the feedstock being fed.

The reaction hydrogen is recirculated to the base of the reactor. As, for reasons of productivity of the reaction system, the maximum liquid filling degree of the reactor must be obtained (minimum hold-up gas), said flow-rate must be lower than 2500 kg/hour for each $m^2$ of reactor section, regardless of the height of the latter.

In industrial reactors, the reaction hydrogen recirculated to the base of the reactor, contributes limitedly to the removal of the conversion products which must therefore be obtained by means of a combined stripping section.

The reactor can operate with partial filling with an effluent substantially in vapour phase and with the stripping section positioned in its interior.

The reactor can operate with a full volume with a biphasic L/V effluent in which the stripping section is situated inside and the stripping gas is introduced into the upper part of the reactor and distributed over the whole surface.

The reactor can be equipped with external circulation of the reaction mass by means of a pump: in this case, the stripping gas can be introduced downstream of the circulation pump which operates with a flow-rate at least equal to 20% of the flow-rate of the fresh feedstock treated.

The reactor can operate with a full volume with a biphasic L/V effluent sent to a phase separator with a cyclone effect, wherein the stripping gas is introduced into the separated liquid phase, preferably in countercurrent, and wherein the residual liquid is recirculated to the reactor, possibly by means of a pump, at a flow-rate equal to at least 20% of the flow-rate of the feedstock treated: in this case, the stripping gas could also be introduced into the top part of the reactor and distributed over the whole surface.

The reactor can be equipped with external circulation of the reaction mass by means of a pump: in this case, the stripping gas can be introduced downstream of the circulation pump which operates with a flow-rate at least equal to 20% of the flow-rate of the fresh feedstock treated.

The reactor can be equipped with an internal recirculation pump of the reaction mass: in this case, the stripping gas can be introduced into the duct downstream of said pump which operates with a flow-rate equal to at least 20% of the flow-rate of the fresh feedstock treated.

In both of the two latter possibilities, the biphasic L/V effluent leaving the reactor can be sent to a phase separator with a possible cyclone effect, wherein the stripping gas is introduced into the separated liquid phase, preferably in countercurrent.

5 embodiments of the present invention are now provided with the help of FIGS. 1-5 enclosed, which however should not be considered as limiting the scope of the invention itself.

Figure 1:
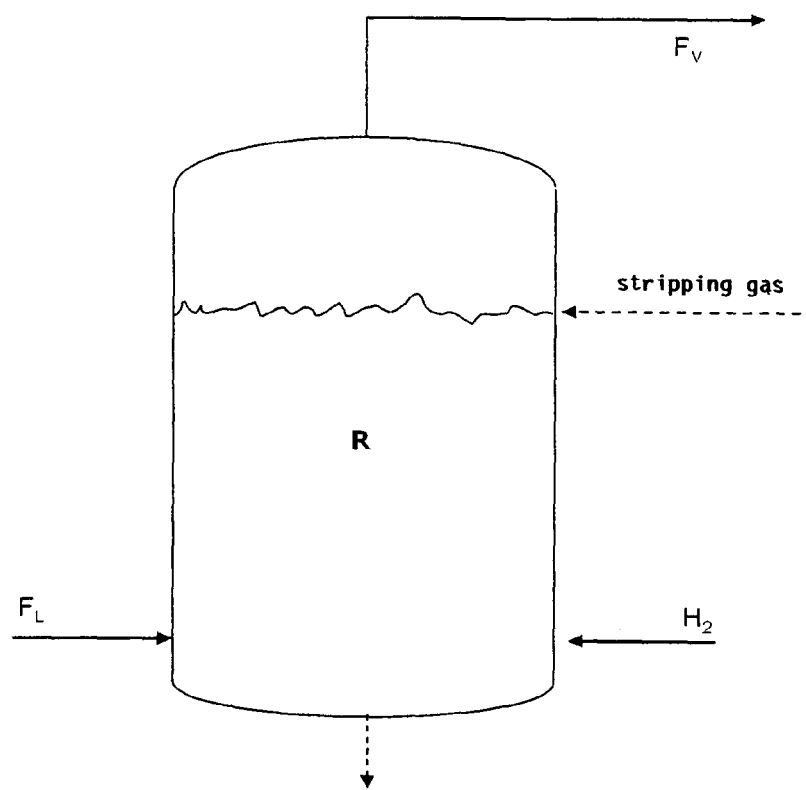
FIG. 1: scheme of a system containing a reactor and stripping section.

In FIG. 1 a system consisting of a reactor and stripping section is schematized.

A heated gas is introduced into the head of the reactor (R) to facilitate the extraction of the high-boiling products in particular those known as heavy gas oils, otherwise extracted by means of vacuum distillation. The stripping gas can consist of the same reaction gases recycled to the reactor after condensation of the hydrocarbons. The reactor, which is homogeneously stirred, operates under stationary conditions and is of the stirred tank reactor or bubble tower type, this latter type of reactor being preferred for the uniform stirring which it ensures in every micro-element of the reaction medium and for the absence of elements in its interior which can obstruct the circulation of the liquid mass. In the case of a bubble tower, the gaseous kinetic vector, which ensures a fluid-dynamic regime of the reactor, consists of the same hydrogen, i.e. a mixture containing hydrogen, necessary for the reaction. The reaction hydrogen is fed to the base of the reactor through a suitably designed apparatus (distributor) for obtaining the best distribution and the most convenient average dimension of the gas bubbles and consequently an effective uniform stirring in every micro-element of the reaction medium. A pump can be installed at the internal base of the reactor to make the mixing of the fresh feedstock in the reaction medium more rapid. At the point where the feedstock to be treated comes into contact with hydrogen in the presence of a catalyst, the reactor is equipped with a level control system which can optionally use a nuclear ray level indication system. The level control commands the feeding of the feedstock to be treated whose flow-rate $F_L$ balances the flow-rate $F_V$ of the products extracted from the vapour phase. The flow-rate $F_L$ established by the level indicated increases with an increase in the temperature set for the reactor.

Figure 2:
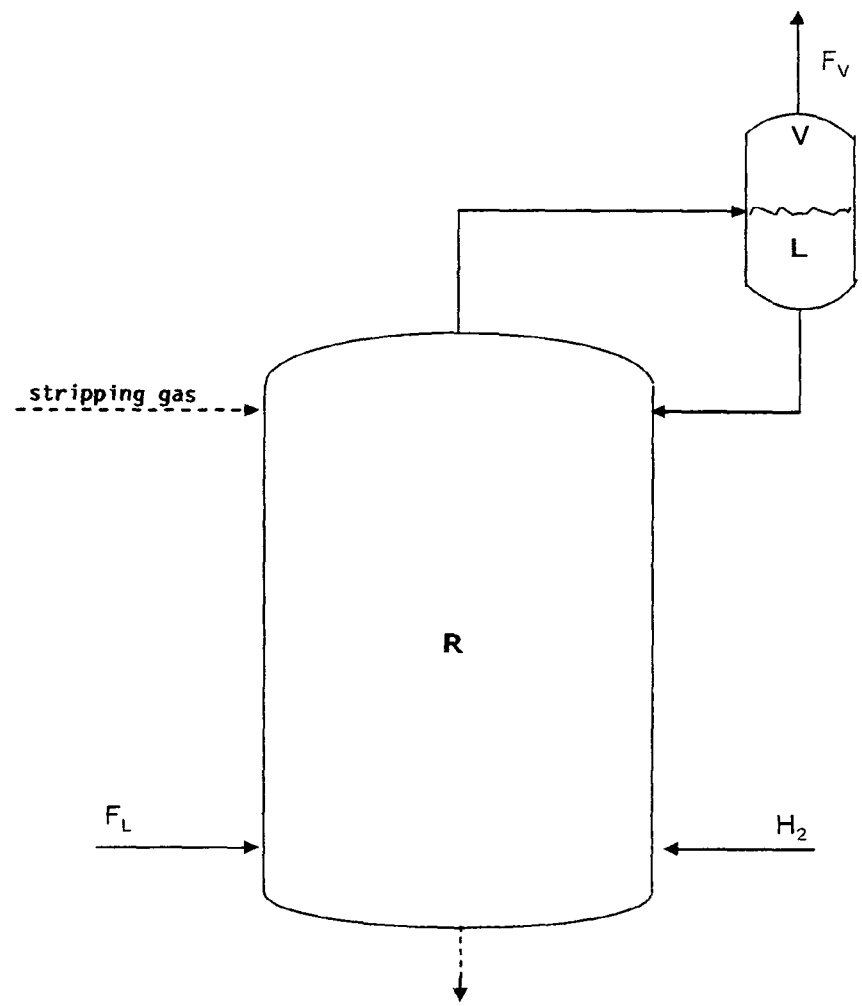
FIG. 2: scheme of a system containing of a reactor, a stripping section and a liquid-vapour separator in which the stripping is effected in the upper part of the reactor.

FIG. 2 schematizes a system consisting of a reactor, a stripping section and a liquid-vapour separator in which the stripping is effected in the upper part of the reactor.

The stripping by means of gas, or hydrogen and mixtures thereof, of the high-boiling products produced in hydrocracking processes, can also be combined with reactors designed for operating with the whole volume occupied by the reaction medium, with a biphasic L(liquid)/V(vapour) effluent and recovery of the vapour phase in a subsequent vessel, possibly with a cyclone effect, from which the liquid separated flows back to the reactor. The L/V interface, from which the input for the regulation of the flow-rate of the feedstock being fed, derives, is positioned in this vessel. The gas is introduced by means of a distributor in the top part of the reactor.

Figure 3:
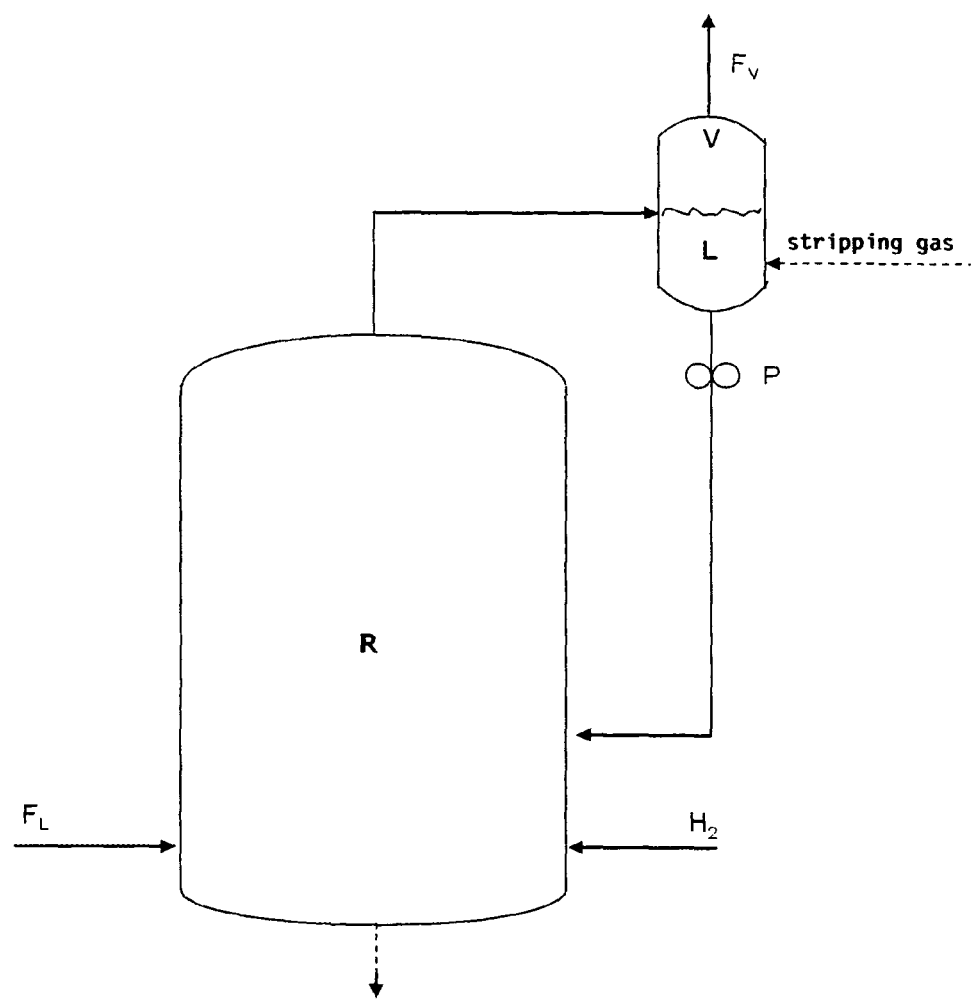
FIG. 3: scheme of a system consisting of a reactor, a stripping section and a liquid-vapour separator in which the stripping is effected outside the reactor.

FIG. 3 schematizes a system consisting of a reactor, a stripping section and a liquid-vapour separator in which the stripping is effected outside the reactor.

Remaining with the case of a reactor which operates with a full volume and consequently with a biphasic effluent, the stripping of the high-boiling products is otherwise effected by introducing the stripping gas, preferably in countercurrent, into the liquid phase of the vessel-cyclone-stripper fed by the biphasic effluent coming directly from the reactor.

The L/V interface which is established provides the input for regulating the flow-rate of the feedstock. The liquid phase at the bottom of the stripper is recirculated to the reactor with the specific pump P. By acting on the flow-rate of this pump, the hourly quantity of high-boiling products extracted from the reactor and consequently the concentration of high-boiling products in the reaction medium, is regulated, the other conditions (temperature of the reactor, gas temperature and flow-rate) remaining unaltered. The flow-rate of the pump P is at least equal to 20% of the flow-rate of the fresh feedstock treated. The reactor and stripper can operate at different temperatures allowing the temperature of the reactor and the temperature of the stripper to be optimized independently of each other. The hot gas stripper, hydrogen and its mixtures being preferred, is also used to ensure the thermal balancing of the reactor and supply the heat for the evaporation of the conversion products avoiding the use of high-temperature heat exchangers, frequent sources of coke formation.

Figure 4:
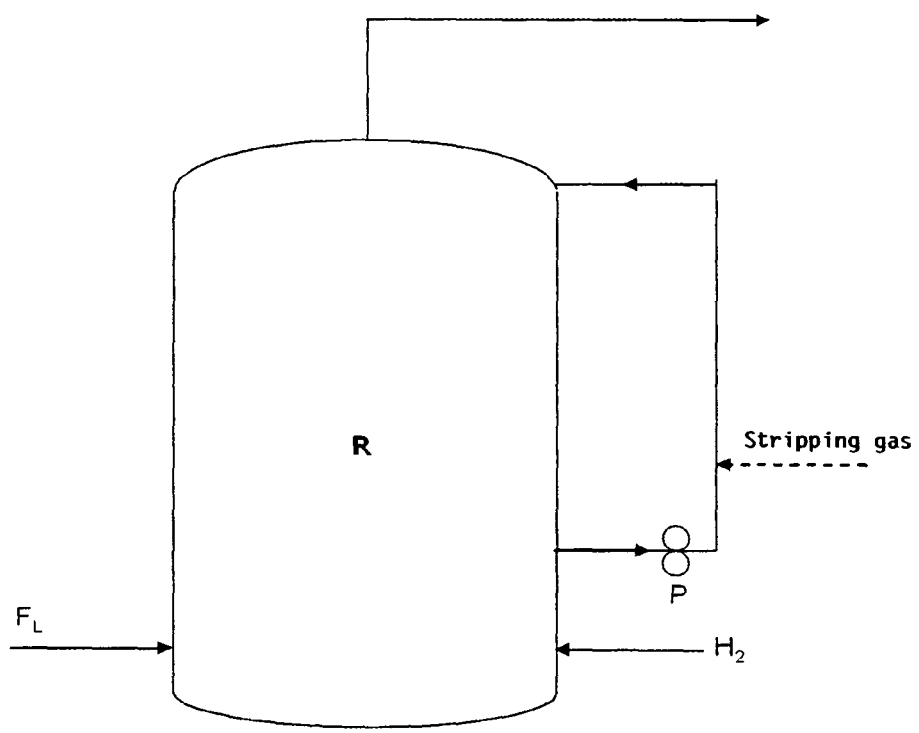
FIG. 4: scheme of a system containing a reactor and a stripping section wherein the reactor is equipped with means for the external circulation of the reaction mass

FIG. 4 schematizes a system consisting of a reactor and a stripping section wherein the reactor is equipped with means for the external circulation of the reaction mass.

Passing on to the case of a hydrocracking reactor operating with external circulation of the reaction mass wherein the liquid return is positioned in the top area of the reactor, the stripping of the conversion products, including the high-boiling products, can be effected by introducing hot gas in delivery from the pump. Static mixers can be inserted in the outer circuit for favouring the gas-liquid contact.

Also in this case, by acting on the flow-rate of the circulation pump P, the quantity of high-boiling products extracted from the reactor and consequently the concentration of high-boiling products in the reaction medium, is regulated, the other conditions (temperature of the reactor, stripping gas temperature and flow-rate) remaining unaltered. The flow-rate of the pump P is at least equal to 20% of the flow-rate of the fresh feedstock treated.

Figure 5:
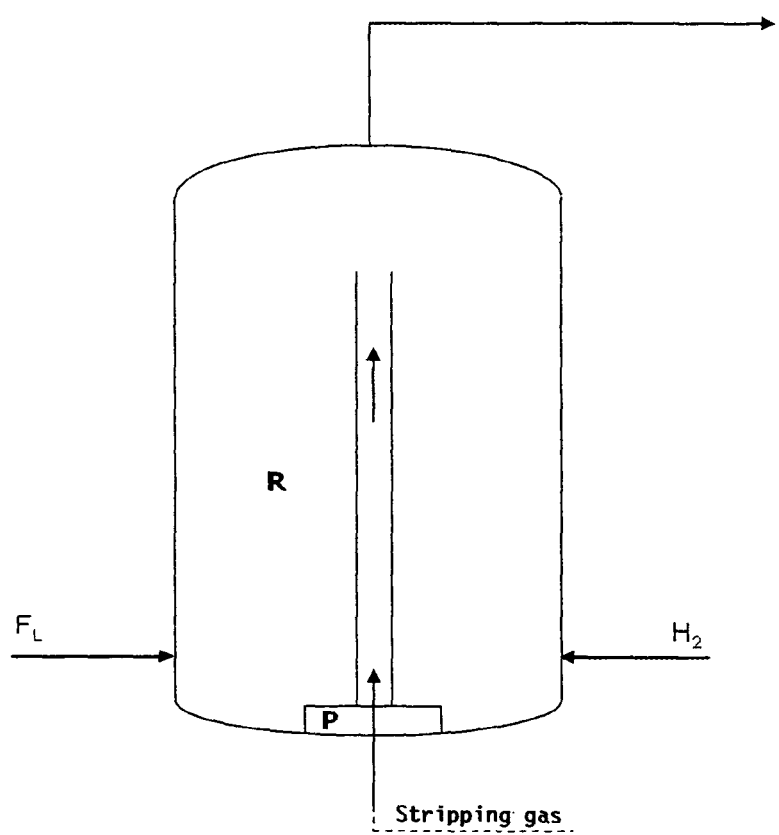
FIG. 5: scheme of a system containing a reactor and a stripping section wherein the reactor is equipped with means for the internal recirculation of the reaction mass.

FIG. 5 schematizes a system consisting of a reactor and a stripping section wherein the reactor is equipped with means for the internal recirculation of the reaction mass.

A further reaction section is represented, which uses a hydrocracking reactor with a recirculation pump of the reaction mass positioned in the lower cap inside the reactor. The stripping gas is sent to the lower part of the circuit, in delivery from the pump P. The liquid and gas are introduced into the top part of the reactor. Static mixers can be positioned in the duct at the outlet of the pump to favour the liquid-gas contact. Also in this case, the value of the flow-rate P, with the same temperature of the reactor, temperature and flow-rate of the gas, determines the quantity of high-boiling products extracted. The flow-rate of the pump P is at least equal to 20% of the flow-rate of the fresh feedstock treated.

Combinations of the schemes of FIGS. 1-5 are also possible.

In particular the following schemes, for example, can be combined:
- of FIGS. 2 and 3 for which the same scheme as FIG. 3 is obtained, integrated by a further stripping section in which said stripping is effected in the upper part of the reactor;
- of FIGS. 3 and 4 for which the same scheme as FIG. 4 is obtained, integrated by a liquid-vapour separator of the effluent of the reactor;
- of FIGS. 3 and 5 for which the same scheme as FIG. 5 is obtained, integrated by a liquid-vapour separator of the effluent of the reactor.

An example is provided hereunder for a better illustration of the invention but this should not be considered as being limited thereto or thereby.

EXAMPLE 1

The system, in accordance with FIG. 3, uses a reactor of the bubbling tower type which operates with total filling, in which the outlet of the biphasic effluent is positioned in the top cap. The biphasic effluent is sent to a phase-stripper separator combined with the reactor. The liquid phase is collected in the lower part of the separator and is subjected to stripping in countercurrent with hydrogen introduced at a flow-rate equal to 77 kg for every 100 kg of feedstock treated.

After the removal of the high-boiling products, the liquid is recirculated to the reactor by means of the pump P at a flow-rate equal to 1.3 times the flow-rate of the feedstock treated. The outflow of the reaction system exclusively consists, without the flushing, of the vapour phase which emerges from the separator-stripper.

The hydrogen, which is necessary for feeding the reaction and supporting the stirring of the reaction mass, is introduced by means of a suitably designed distributor at the base of the reactor at a flow-rate equal to 1150 kg/h per $m^2$ of internal horizontal section of the reactor. The hydrogen is heated to 520° C. to compensate the temperature of the feeding feedstock, consisting of vacuum residue obtained from *Borealis* Canadian bitumen containing 5.1% of sulphur, 19% of asphaltenes from n-pentane and $THF_i<1$ kg/ton. For the determination of the insoluble products in tetrahydrofuran, the following procedure is adopted. Weighing a quantity of sample ranging from 1 to 5 g approximately. Dissolving the sample with a few ml of THF and transferring it completely, by means of successive washings, to a suitably sized flask. Subsequently adding further THF until a dilution of sample of 40 times (w/w) is obtained. Treating the solution in an ultrasound bath for about 10 minutes; transferring the flask to a rotating evaporator and keeping it under stirring at a temperature of 50° C. for 5 minutes, preventing the evaporation of the solvent. Letting the flask rest at room temperature for 30 minutes. Filtering the solution under vacuum, using Teflon filters with a porosity of 5 μm. Subsequently recovering with THF, any possible particles of insoluble products remaining on the bottom of the flask. Repeatedly washing the filter with THF and letting the residue dry for about one minute. Transferring the filter with the residue to a Petri capsule. Drying under vacuum at 150° C. for 30 minutes. Removing from the oven and cooling for 5 minutes. Weighing the filter. The solids obtained are compared with the weight of the starting sample.

The catalyst is charged "una tantum" to the start-up of the reactor. In this specific case, a quantity of molybdenum octoate equal to 7 kg (expressed as molybdenum) is charged for each $m^3$ of reaction volume.

Under the pre-established reaction conditions (T: 420° C.; P: 160 bar) a ton of residue from *Borealis* vacuum generates 3.987 kg of residue insoluble in tetrahydrofuran of which 0.639 kg refer to the metal sulphides (prevalently Ni and V) initially contained in the feedstock, the complement consisting of coke and insoluble asphaltene resins.

In the case in question, the insoluble residues in tetrahydrofuran were accumulated to a value equal to 13% (corresponding to 70 kg per $m^3$ of reaction volume of coke and metallic sulphides) and at this point the flushing was initiated so as to equalize the quantity of solids deriving from and generated by the feedstock to keep the build-up level constant.

The flow-rate of feedstock in the feeding, revealed by the level indication situated at the L/V interface of the stripping unit, under the pre-established reaction conditions, proved to be equal to 133 kg/h per $m^3$ of reaction volume, in equilibrium with the quantity of products extracted in the vapour phase.

The efficacy of the stripper was controlled by analyzing the content of high-boiling products in the liquid phase (fraction with a boiling point lower than 480° C.). By operating with stripping hydrogen at 380° C., a temperature of the liquid phase of the stripper of 406° C. was observed, corresponding to a concentration of high-boiling products in the liquid recirculated to the reactor equal to 23. By increasing the temperature of the stripping hydrogen, a rise in the temperature of the stripped liquid was produced. By bringing the liquid of the stripper to 430° C., the concentration of high-boiling products is reduced to 14%. The conversion products recovered from the vapour phase contain 80% of 480⁻ fraction. For the characteristics observed, these products can be processed in line with a fixed-bed hydrotreater for the specification set-up of S and N. The reaction system was kept under continual functioning for a prolonged time without observing any further reduction in the catalytic activity or productivity of the reactor, in accordance with the results of the physicochemical controls effected periodically on the catalyst test-sample.

The invention claimed is:

1. A system for the hydroconversion of heavy oils consisting essentially of a solid accumulation reactor and a stripping section of the products of hydroconversion outside the reactor itself,
wherein the reactor is equipped with means for the external circulation of a reaction mass, comprising a circulation pump and recirculation ducts, from a lower side point to a side point in an upper part of the reactor itself, and
wherein the stripping section is positioned so as to effect stripping by entry of hot gas into the recirculation ducts in delivery from the circulation pump.

2. A system for the hydroconversion of heavy oils consisting essentially of a solid accumulation reactor and a stripping section of the products of hydroconversion inside the reactor itself,
wherein inside the reactor there are also means, comprising a circulation pump and a recircualtion duct, for the internal recirculation of a reaction mass from a lower side point to a side point in the upper part of the reactor itself, and
wherein the stripping section is positioned so as to effect stripping by entry of hot gas into the same recirculation duct.

3. The system according to claim 1 or 2, wherein the solid accumulation reactor is a stirred tank reactor or a bubble tower reactor.

4. The system according to claim 2, wherein the stripping section is also positioned so as to effect stripping in the upper part of the reactor itself, and wherein the reactor is a partially filled reactor.

5. The system according to claim 1, which further comprises a liquid-vapor separator, optionally comprising a cyclone, wherein the liquid-vapor separator is positioned downstream of the reactor and the stripping section is positioned between the reactor and the liquid-vapor separator.

6. The system according to claim 5, which further comprises a liquid-vapor separator, optionally comprising a cyclone,
wherein
the liquid-vapor separator is positioned downstream of the reactor,
the stripping section is positioned so as to effect stripping in the upper part of the reactor, and
the reactor is totally filled.

7. The system according to claim 6, which further comprises a stripping section outside of the reactor.

8. The system according to claim 5, which further comprises a stripping section inside the reactor.

9. The system according to claim 1 or 2, which further comprises a liquid-vapor separator, optionally comprising a cyclone, and a further stripping section outside the reactor and positioned in the liquid-vapor separator or downstream thereof so as to effect stripping outside the reactor and ensure the recirculation of the stripped liquid by means of the circulation pump to the reactor itself.

10. The system according to claim 1, wherein the reactor contains no elements inside thereof which can prevent a uniform stirring of a reaction mass.

11. A process for the hydroconversion of a heavy oil, comprising sending the heavy oil to the system of claim 1 and hydroconverting the heavy Oil therein, wherein
the reactor contains a hydrogenation catalyst in a slurry phase, and
hydrogen or a mixture of hydrogen and $H_2S$ are fed into the reactor.

12. A process for the hydroconversion of a heavy oil, comprising sending the heavy oil to the system of claim 2 and hydroconverting the heavy oil therein, wherein
the reactor contains a hydrogenation catalyst in a slurry phase, and
hydrogen or a mixture of hydrogen and $H_2S$ are fed into the reactor.

13. The process according to claim 11 or 12, wherein the hydroconversion products are obtained exclusively in a vapor phase.

14. The system according to claim 1, which further comprises a liquid-vapor separator, optionally comprising a cyclone, wherein the liquid-vapor separator is positioned downstream of the reactor and the stripping section is positioned in the liquid-vapor separator.

15. The system according to claim 1, which further comprises a liquid-vapor separator, optionally comprising a cyclone, wherein the liquid-vapor separator is positioned downstream of the reactor and the stripping section is positioned downstream of the liquid-vapor separator.

* * * * *